United States Patent

[11] 3,550,673

| [72] | Inventors | Richard J. Gallagher |
| | | Racine, Wis.; |
| | | Richard J. Christensen, Glenview, Ill.; |
| | | Gordon M. Dougall, Racine, Wis. |
| [21] | Appl. No. | 735,521 |
| [22] | Filed | June 10, 1968 |
| [45] | Patented | Dec. 29, 1970 |
| [73] | Assignee | Foundry Allied Industries, Inc. |
| | | Racine, Wis. |
| | | a corporation of Wisconsin |

[54] POLYURETHANE MOLD ARTICLES
8 Claims, No Drawings

[52] U.S. Cl. ................................................. 164/228;
164/138, 164/249; 161/190, 161/164
[51] Int. Cl. ..................................................... B22c 7/06
[50] Field of Search ........................................... 164/21, 23,
24, 33, 37, 41, 43, 228, 138, 235, 249;
161/(Inquired); 260/77.5AM; 117/161KP;
249/134

[56] References Cited
UNITED STATES PATENTS

| 2,990,388 | 6/1961 | Johnston et al. | 164/43X |
| 3,121,267 | 2/1964 | Snoeyen Bos et al. | 164/235 |
| 3,396,051 | 8/1968 | Cox et al. | 117/161 |
| 3,427,178 | 2/1969 | Zakim et al. | 117/161X |
| 3,437,551 | 4/1969 | Marshack | 161/190 |
| 3,440,086 | 4/1969 | Kerns | 117/161(KP)X |

OTHER REFERENCES

M. J. Bodnar and E. R. Kelly, Room-Temperature Curing of Polyurethane Adhesives, " Adhesives Age, " Vol. 2, No. 4, April, 1959, pages 29-33.

*Primary Examiner*—J. Spencer Overholser
*Assistant Examiner*—John E. Roethel
*Attorney*—Burmeister, Kulie & Southard

ABSTRACT: Urethane molds such as patterns, core boxes and liners. Urethane molds may be adhered to continuous retainers to form core liners, or the urethane molds may be formed with substantially unmodified outside surfaces to operate as core boxes without retainers. Patterns are cast and formed in various ways. The urethane bodies of the molds are formed from urethane compositions having controlled amounts of preferred diamine catalysts to prevent sand sticking, and with controlled amounts of organic miscible diluents to permit the urethane to cure into bodies without formation of voids which would interfere with castings and sand core formations. The urethane mold may be colored, and a plurality of colored layers may be provided to report various degrees of wear on the mold faces.

POLYURETHANE MOLD ARTICLES

This invention relates to mold compositions, and particularly relates to urethane molds such as patterns, liners and core boxes.

The metal casting art uses automatic core making machines in which sand is injected under pressure into a mold cavity, and the sand is then solidified by various means. Many solidification procedures provide admixing various resin systems with the sand and then curing such resins by thermal or chemical processes to solidify the cores. In the so-called cold process, catalysts of various types may be introduced in vapor form to cure the resin dispersed throughout the sand. Such "cold box" cores have become increasingly popular the metal casting industry because the "hot box" binder systems generally require heat conducting metal molds which present problems of machining, warpage, and other problems.

Even in the "cold box" core forming systems, metal molds are used which lead to many of the same objections. The art has attempted to overcome the problems of machining and expense by searching for castable substitute materials which could serve as molds or mold liners. Some attempts have been made to utilize castable plastic systems, and the epoxies are used for this purpose. The epoxies have not been entirely satisfactory because dimensional problems are encountered from the high exotherm in curing, and because the cured resin tends to be brittle. In order to control the problem of exotherm, epoxy liners must be cast relatively thin, say about three-eighths of an inch, or must be compounded with fillers to reduce shrinkage, and this seriously handicaps the usefulness of this material.

While plastic systems have potential attraction, numerous problems must be met and overcome in devising any such system. The problem of exothermic curing must be overcome because only low shrinkage in the formation of the mold is acceptable, say in the order of no more than 0.5 percent linear or volumetric shrinkage. Said molds should have smooth mold bearing faces so as not to interfere with attaining smooth sand surfaces. The molds, of course, must be sufficiently abrasion resistant to maintain dimensional tolerance. It is likewise desirable that a plastic system be curable in a relatively short time, even at room temperature and with no objectionable shrinkage. It is also desirable to use economical wood patterns without encountering charring. It is also required that such mold bodies have a long storage life with dimensional stability, and that the faces lend themselves to relatively simple, economical and reliable repair.

In view of the foregoing considerations in this art, it is one understandable and important object to provide an improved mold to form sand cores in which the mold is a resin body which has been formulated to solve as many of the listed objections as possible, and to attain as many of the listed advantages as possible.

Another important object of the invention is to provide a mold made of a cured resin body which is hard and abrasion resistant, and which is cured at room temperature to thereby obviate the disadvantages of heat cure.

Still another important object of the invention is to provide a resin composition and cured resin body which can be used as a pattern, core box liner or as a core box, and which resin body is substantially free of voids or surface modifications which would interfere with the desired surface smoothness.

It is likewise an important object of the invention to provide a resin composition for core box liners, core boxes and patterns which has the foregoing advantages, and which further permits the mold faces to be effectively, simply and economically repaired or restored with the same resin composition.

A particular resin system which attains the desired advantages has been found to be a urethane polymer curable by diamines. While other curing agents are known and available for the urethanes, the diamines have marked advantages of economy and effectiveness, and desirable structural and physical properties. It has, however, been found that diamines may be counterindicated for sands which have resin binders including components reactive with said diamines. This would understandably lead to sand sticking to the mold, or it would lead to other undesirable disruptions in the formation of the sand core.

While urethanes may present the apparent advantages indicated, such urethanes are also widely known as being very susceptible to bubble formations which appear as voids in the body of cured urethane. The presence of such voids would make the urethane body totally unacceptable as a pattern, core box or core box liner for sand cores.

It is therefore another important object of the invention to provide an urethane composition useful for forming hard molds, patterns, core boxes or core liners in which the surface is free of voids which would interfere with desired formations.

It is another object to provide a urethane composition in which diamines are used to cure the urethane to attain desired physical and structural properties without encountering complications with conventional resin binders employed with sand for making sand cores.

A still further object is to provide a mold of a cured urethane body with descrete layers of different colors to report degrees of wear to the mold so that the practitioner may know when to repair the worn molds.

Yet another important object of the invention is a urethane mold for patterns, core box liners or core boxes which enjoy the foregoing advantages, and which further have improved lubricity which leads to an advantageous release of a pattern or sand core from the mold.

The foregoing advantages and objects are attained by the present invention, as well as still other objects and advantages which will occur to practitioners from considering the following disclosure.

Reference will be made herein to the term "mold" alone or in conjunction with other terms such as "composition" and "article". It should be understood that such term is intended to be used interchangeably with "core box", "core box liner," "liner" or "pattern". The composition of this invention may, in other words, be employed to form core boxes, liners and patterns. Similarly, articles of the foregoing types may be fashioned from the compositions which will be described in detail.

It has been found that core box liners and core boxes formed from the urethane compositions disclosed herein lead to many advantages when used to form sand cores in machines which deliver such sand under high pressure injection into the mold cavity of the core box. The cured urethane bodies which form the molds are serviceable for sand core formation, they may be readily repaired following hard use, and they may be stored for long periods without substantially altering their physical properties or dimensions.

It has been found that a highly desired diamine curing agent may be employed without the expected problem of sand sticking by controlling the relative amounts of diamine and the molecular weight of the urethane composition. In general, it has been found that if the diamine curing agent is added in amounts between 80—95 percent of the theoretical stoichiometric quantity of the composition, the resulting cured body has the desired physical properties and does not cause any undesired sand sticking with the reactive components of the resin binders in the sand used for making cores. The foregoing range is not exactly defined because the characteristics of the resulting cured urethane will depend in part on the nature of the actual diamine and the particular characteristics of the urethane polymer used in the composition. The practitioner will know that adding a particular diamine in amounts substantially in excess of 100 percent of the theoretical stoichiometric quantity will accordingly lead to greater and more objectionable sand sticking. Such skilled practitioner will also know that if the diamine content is reduced substantially below about 80 percent stoichiometry, then the desired physical properties of the cured urethane body will be progressively lost.

It has hardness. been found that a particular type of urethane polymer must be used to obtain the desired hardness of the cured urethane body. The final useful hardness must be in about the range of 60 to 75 Shore D hardness. This is attained by using a urethane polymer having an isocyanate content of about at least 8 percent by weight. Among the useful urethane polymers used in this invention are those having an isocyanate content of about 8 to about 10 percent by the weight of the urethane polymer. When such urethane polymers are cured with a diamine in the foregoing ranges, the desired hardness of the cured urethane product is attained. Useful diamine curing agents are known to the art, and representative examples include anilines, such as methylene bis orthochloroaniline and methylene dianiline.

Another important feature of the invention is that the urethane compositions include miscible organic diluents which sufficiently lower the viscosity of the urethane mixture during its pot life so that the resulting cured body of urethane resin does not develop voids or bubbles. It has been found that such miscible organic solvents may be added in amounts of about 20 percent by weight of the composition to attain the desired void-free surface without substantially altering the desired physical properties of the cured urethane body. Such miscible organic solvents may include plasticizers such as the phthalates alone or in admixture with small amounts of organic solvents such as dimethyl formamide or N-pyrol. It is understood, however, that other equivalent and compatible miscible organic solvents may be used as diluents to lower the viscosity of the urethane composition during its pot life.

The urethane compositions which can be used to advantage for purposes of the invention generally include about 100 parts of a urethane polymer containing at least about 8 percent by weight of isocyanate, about 25 to about 31 parts by weight of a diamine curing agent, and about 30 to about 40 parts by weight of a miscible organic diluent.

A representative of the type of urethane polymer which is successfully used is that supplied under the trade designation of Adiprene L 213 by the du Pont Co. This polymer has an isocyanate content of about 9 to about 9 5/10th percent by weight. A successful phthalate plasticizer which may be used as a miscible organic diluent is dioctyl phthalate. Other diluents which are useful are supplied under the trade designations of Flexol TOF and Flexol 360 (Union Carbide) and Celluflex CEF (Cellanese Corp. of America).

It is preferred to employ a small amount of a colorant in the urethane composition, about less than 5 parts in the foregoing proportions. Useful colorants are those supplied by the Ferro Corp. of Cleveland, Ohio, in which color concentrates are dispersed in a liquid epoxy paste. Among such useful pastes are red V-859, green V-1642, turquoise V-662 and yellow V-927. It is also desirable to add a lubricant to the foregoing general proportions of ingredients, and such a lubricant may be added in amounts of about 5 to about 10 parts be weight. It has been found that when such a lubricant is incorporated in the urethane composition, improved release of the mold is attained. The use of the lubricant in the urethane composition does not dispense with spraying or applying a lubricant to the mold cavity faces, but it does lead to an improved mold release. A variety of compatible lubricants may be employed such as zinc stearate, calcium stearate, adipic acid, oleic acid and other fatty acids, as well as molybdenum disulfide and graphite. It has been found to be particularly useful to employ silicone oils such as those provided under the trade designation of Dow Corning silicones. These tend to be surface migrating lubricants, and they are supplied in preparations having viscosities of about 350 cps.

Patterns, core boxes and liners are made according to the teachings of this invention by following generally recognized and conventional steps in the art. The urethane composition disclosed herein is used in such steps to attain improvements and advantages in the practice of the invention. It is known, for example, that patterns may be machined from a solid blank, or that such patterns may be cast in closed female molds to obtain either a preform or a final pattern form. The preform is cast with a finish allowance surface which can be manually or machine finished to the desired form.

The pattern may also be formed on a male model deposited in spaced relation to a female model. The male models are usually shells or solids which approximate the shape of the pattern. The space is filled or backed up with a cast material which is deposited on a male model. A separation compound allows the male model with the back up coat to be withdrawn from the female model. Alternatively, the female model may first be surface coated before the placement of the male model or mold. Such surface coats are referred to as gel coats in the art. The female model with the gel coat is positioned in spaced relation to the male mold, and this space is then back filled with the cast material. The formed pattern then comprises the male model, a gel coat, and an innermost layer, which may also be called a back fill layer.

The foregoing general methods are characterized by a serious problem when heat curing is employed to solidify certain casting materials. The temperature extremes encountered in heating and cooling often result in coefficients of expansion which differ for the various materials, such materials including the casting material, the models, and the retainers or rough castings. This leads to undesired distortions of the cured or hardened molds, and such distortion renders the mold compositions often useless. It will be readily appreciated that it would be highly desirable to dispense with the heat curing in favor of a substantially room curing system. The urethane compositions of this invention are cured into hard and serviceable bodies at room temperature, thus obviating this marked disadvantage of prior practice.

The urethane compositions are pourable during their pot life which is generally at least about 10 minutes. This is sufficient time to manipulate the composition in various casting and application operations. Solidification of the compositions is well started within an hour or so, and the pattern or model may be stripped from the composition within one half to to one day after curing has started. Efficient room temperature cures are effected several days thereafter, say in about 5 days.

According to the present invention, a urethane body may be used as a blank and then machined to the pattern form. The cured urethane body may also be a preform with a surface allowance for finishing. The urethane composition may also be deposited during its pot life into the space defined between the male and female molds. Likewise, the urethane composition may be applied as a coat to a male mold which is then deposited in spaced relation to the female mold, followed by back filling the space. Similarly, the urethane composition may be directly cast into a female mold which is dimensioned and shaped to close tolerances so that the withdrawn pattern may be used without subsequent finishing.

The urethane composition may be used in ways similar to those just described to form liners or core boxes. A liner or core box may be machined to provide a mold for forming sand cores, but such mold is preferably formed by casting the urethane composition around a male model or pattern. Such male model or pattern may be made from wood, metal, various plastics, or may be a cured urethane body as previously described. The core box or liner may be cast directly by employing a pattern formed to close tolerances, as before. The pattern may be so dimensioned that the box or liner mold is formed with a finish allowance for further machining or manual finishing.

A core box may be formed entirely of a cured urethane body by pouring the urethane composition on a pattern positioned in a casing mold. After the urethane has cured into a hardened body, the casing mold may be withdrawn. Parting compounds may be used to facilitate such withdrawal.

A liner may be cast in the space between a pattern and an approximately shaped female mold surface in a rough casting. The liner may have a plurality of layers which include a gel coat applied by spraying of the urethane composition, or applied by other means. Such layers may also include a back fill between the pattern and the coated female mold.

The urethane compositions of this invention may be used to repair a previously cast urethane body in which the surfaces have become worn or damaged. The urethane composition may be applied as films to the mold faces by spraying, painting, dipping or the like. The films of urethane composition cure and adhere to the original urethene body to simply and economically repair or restore the molds.

It is another advantage that such urethane composition films may be applied in layers in various colors. The first color is applied to the mold by spraying, brushing, or the like, and a film of such urethane composition is formed in a preset thickness corresponding to a predetermined tolerance allowance for forming sand cores of desired dimensions. This first urethane film and subsequent urethane films may contrast to signal a degree of wear. When the underlying color is exposed, the practitioner will be alerted that a certain amount of wear has occurred. When another is exposed, the practitioner will know that he must repair or resurface the mold cavity. The preset thickness of the film or films may be varied in accordance with the requirements of allowable tolerances for a particular sand core or mold.

The foregoing process of applying coats of urethane to a pattern or liner or core box can be followed to provide the number of layers, each of which has a different color code. As an example, a pattern is spray coated with a 0.007". urethane composition to a thickness of about 0.005"—0.007". After the green coat has solidified, a yellow urethane coat is applied of about the same thickness. Another coat is then cast by back filling with a red urethane composition. A separating compound is applied between the green coat and the female mold. The green layer reports an allowable tolerance which is exceeded by the appearance of the underlying yellow coat. The yellow coat reports a second tolerance which, in turn, is exceeded when the underlying red coat shows through. In like manner, a liner or core box may be similarly processed with a plurality of different colored layers by covering the male model with a separating or parting compound, then coating the male model, and finally back-filling between the male model and the female model.

The following example will illustrate one embodiment for obtaining a composition in accordance with the teachings of this invention, but it should be understood that such example does not constitute an exclusive teaching.

| Ingredient: | Parts by weight |
|---|---|
| Adiprene L 213 | 100 |
| MOCA | 29 |
| Dioctyl phthalate | 30 |
| Dimethyl formamide | 5 |
| Colorant, red, V-859 | 2 |
| Silicone oils | 5 |

The Adiprene is a polyether urethane polymer supplied by the du Pont Co., having a specific gravity of 1.15, a Brookfield viscosity at 84° F. of 12,000—18,000 cps, and an isocyanate content of 9.2—9.5 percent, by weight. MOCA is a diamine, namely, methylene bis orthochloroaniline. The colorant is supplied by the Ferro Corp. and is a standard liquid epoxy base composition with a color concentrate. The silicone oils are supplied under the trade designation of Dow Corning silicones, 350 cps. The above ingredients are mixed at room temperature and then deposited between a model and a retainer. The composition is cured at room temperature into a urethane body having a Shore D hardness of between 60—75. The model is removed and the resulting pattern or core box is used to receive sand to form molds or cores. A core liner in a core box may be cast to any desired thickness with virtually no shrinkage. The urethane body is formed in a distinctive color such as red and the face of the urethane body is resistant to sand sticking, impact, abrasion, is cleanable with various solvents, and is formed with substantially no voids which would interfere with the desired function of the pattern or core box.

The invention may now be practiced in various ways, and practitioners should know that such practice will constitute a part of the present invention so long as it comes within the terms of the appended claims as given further meaning by the language of the preceding specification.

We claim:

1. A mold article in the form of a pattern, core box or core box liner, including:
   a cast and cured polyurethane body formed as said article;
   said cured polyurethane body being hard, abrasion resistant, resistant to sand sticking, and being free of voids on a mold bearing face which would interfere with desired formation of said mold articles;
   said urethane body being formed from a polyurethane mixture in which a miscible organic diluent is present in an amount up to about 20 percent by weight to desirably reduce the viscosity and counteract void formation in the mold bearing face of said cured urethane body;
   said polyurethane body formed from a urethane polymer containing at least about 8 percent by weight of isocyanate, said urethane polymer being cured with a diamine in amounts of about 10 percent up to about 20 percent by weight of said mixture, whereby undesirable sand sticking is prevented by high pressure injection of sand which has resin systems reactive to said diamines; and
   said cured polyurethane body having a Shore D hardness of about 60 to about 75.

2. A mold article as in claim 1 which is present as a core box and which includes a continuous retainer, and wherein said cured polyurethane body has one face for positioning against the retainer and an opposite face which includes said mold bearing face.

3. A mold article as in claim 1 wherein: said polyurethane body is formed from about 100 parts of urethane; about 27 to about 31 parts of a diamine curing agent; and about 30 to about 40 parts of a diluent which lowers the viscosity of the urethane during its pot life.

4. A polyurethane body for a mold article as in claim 1 wherein the diamine is methylene bis orthochloroaniline.

5. A polyurethane body for a mold article as in claim 1 wherein the diluent includes a major amount of a phthalate plasticizer and a minor amount of a miscible organic solvent.

6. A mold article as in claim 1, wherein:
   said polyurethane body has a plurality of layers, each layer formed from a similar urethane mixture having a distinctive colorant uniformly mixed therein; and
   said layers including at least a thin innermost layer subject to wear and an outermost layer having the substantial thickness of said cured polyurethane body.

7. A mold as in claim 6 wherein a plurality of colored polyurethane layers are provided next to the outermost layer; and each of said layers having a color distinct from its immediate overlying layer, and each layer having a preset thickness corresponding to a predetermined tolerance allowance, whereby appearance of one underlying layer reports tolerable wear, and appearance of another underlying layer reports non tolerable wear.

8. A mold as in claim 7 wherein said polyurethane body comprises three distinctively colored layers, an outermost polyurethane layer, a substantially thin innermost layer sprayed on a model for said mold, and an intermediate layer sprayed on said innermost layer, said outermost layer being formed as a back fill between said intermediate layer and a retainer member.